INVENTOR.
EDOUARD J.P. CALVET

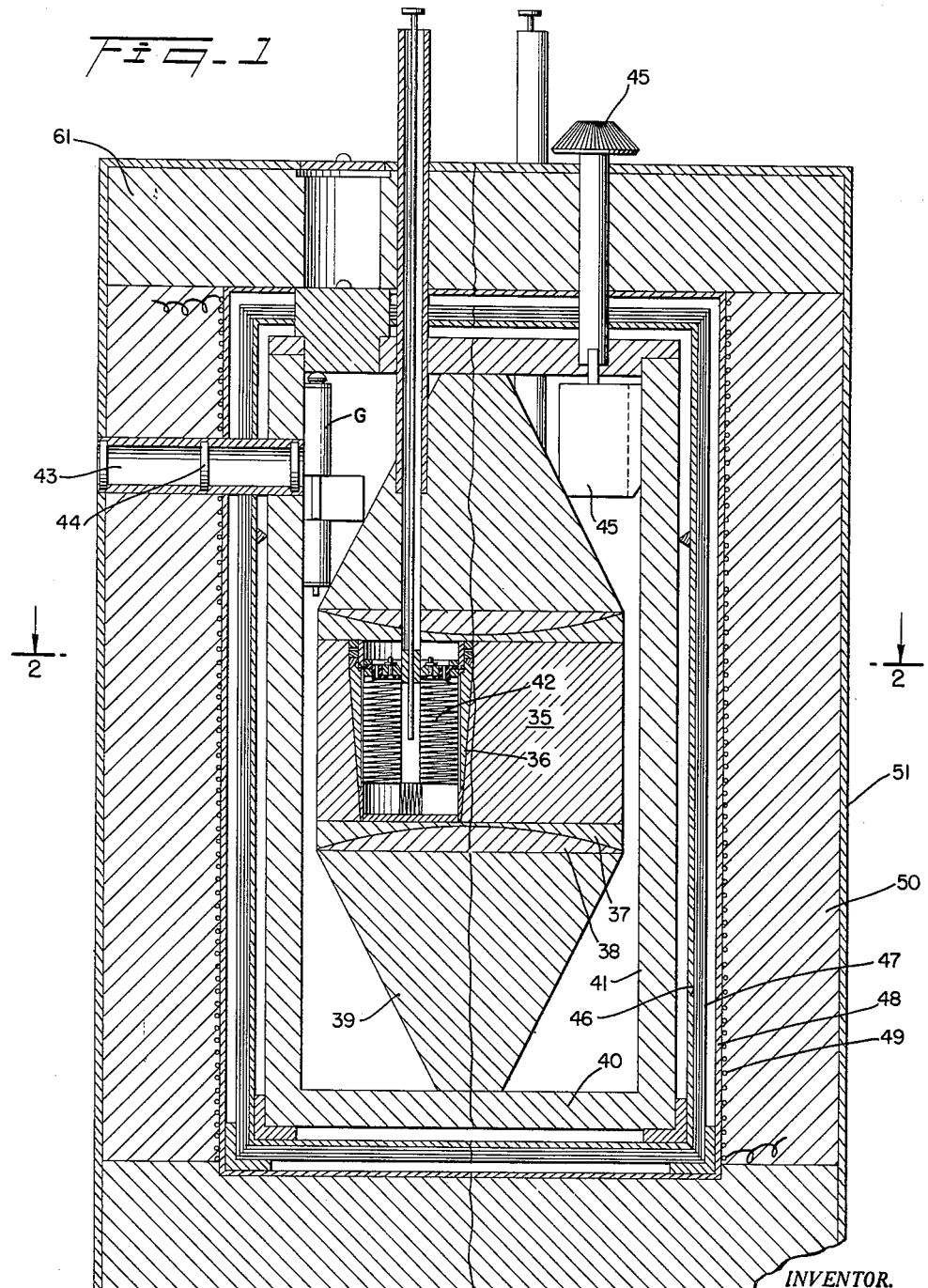

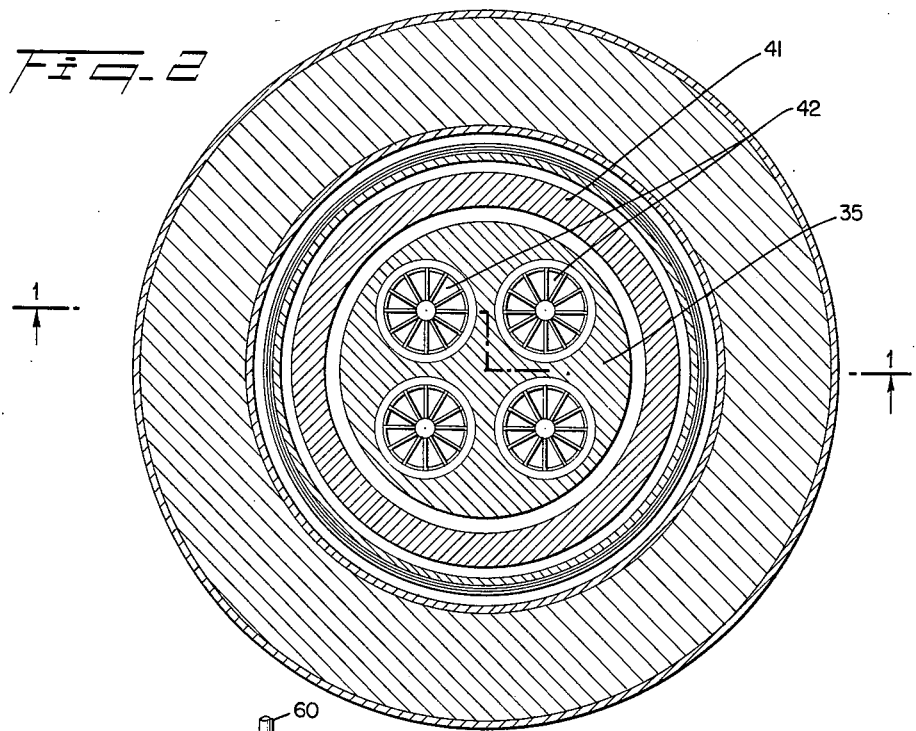
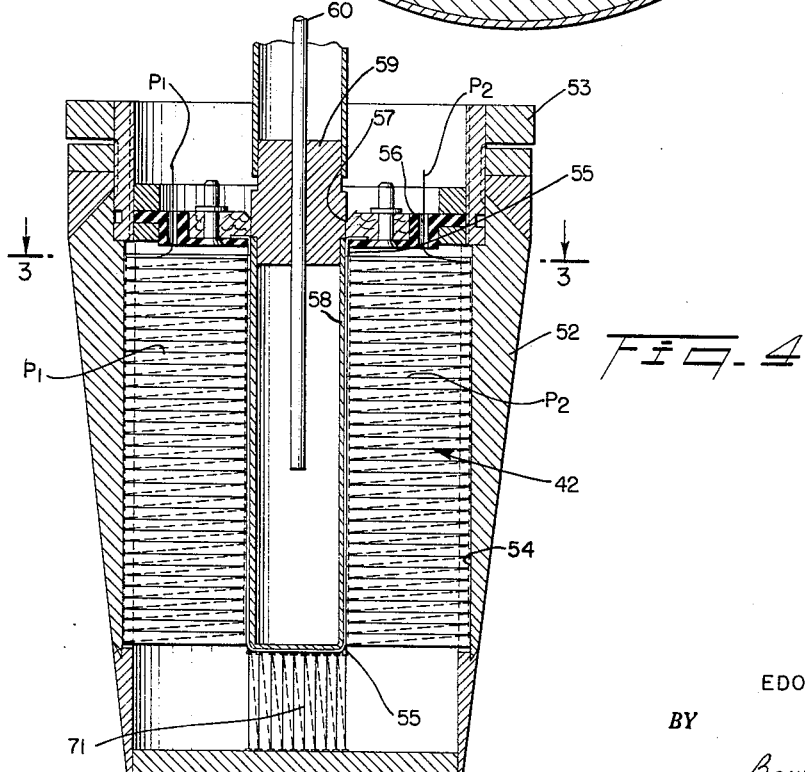

Oct. 23, 1962

E. J. P. CALVET 3,059,471

CALORIMETER

Filed Feb. 19, 1957

INVENTOR.
EDOUARD J.P. CALVET

BY

*Bauer and Seymour*
ATTORNEYS

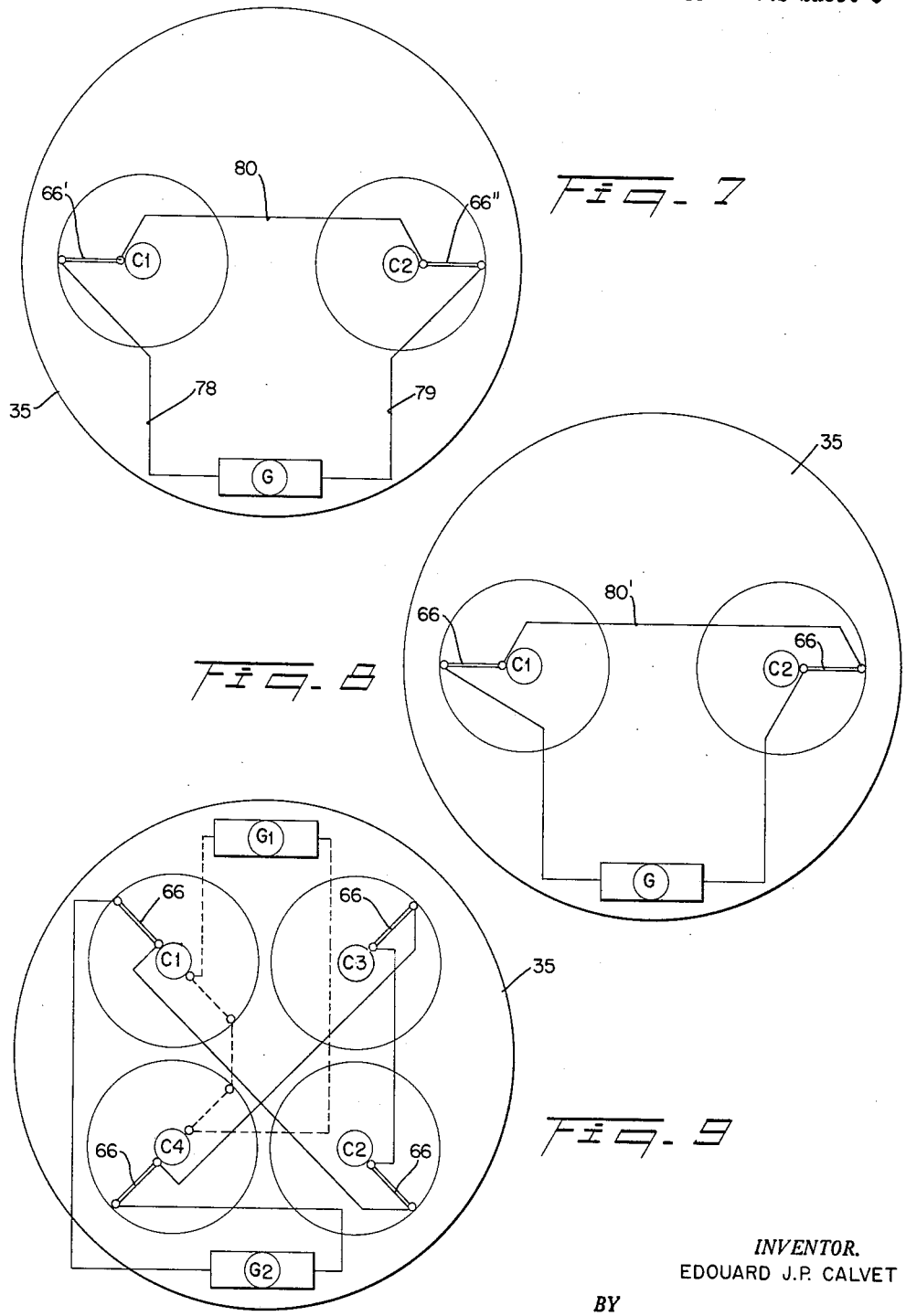

Oct. 23, 1962 — E. J. P. CALVET — 3,059,471
CALORIMETER
Filed Feb. 19, 1957 — 11 Sheets-Sheet 6
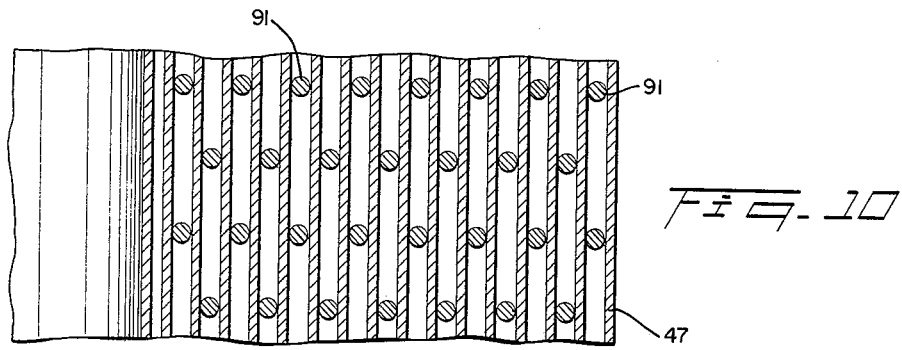
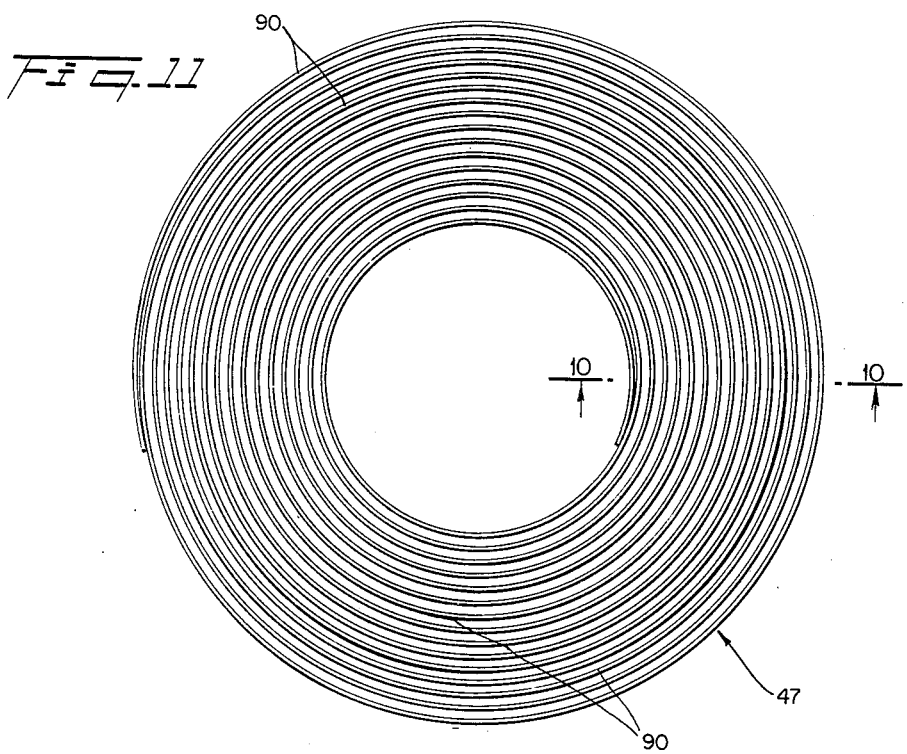
INVENTOR.
EDOUARD J. P. CALVET
BY
Bauer and Seymour
ATTORNEYS

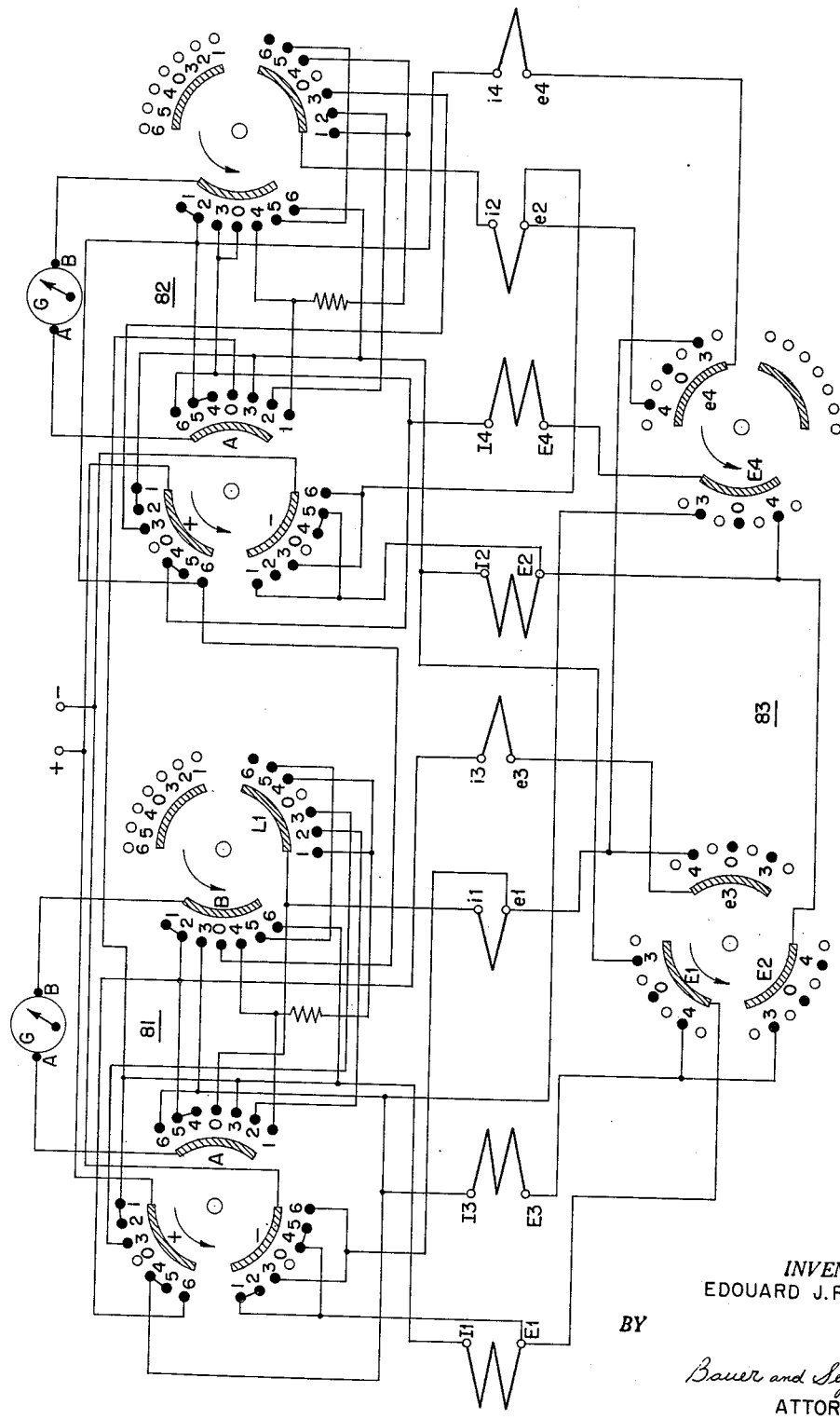

Oct. 23, 1962 E. J. P. CALVET 3,059,471
CALORIMETER
Filed Feb. 19, 1957 11 Sheets-Sheet 8

INVENTOR.
EDOUARD J. P. CALVET
BY
Bauer and Seymour
ATTORNEYS

Oct. 23, 1962    E. J. P. CALVET    3,059,471
CALORIMETER
Filed Feb. 19, 1957    11 Sheets-Sheet 11
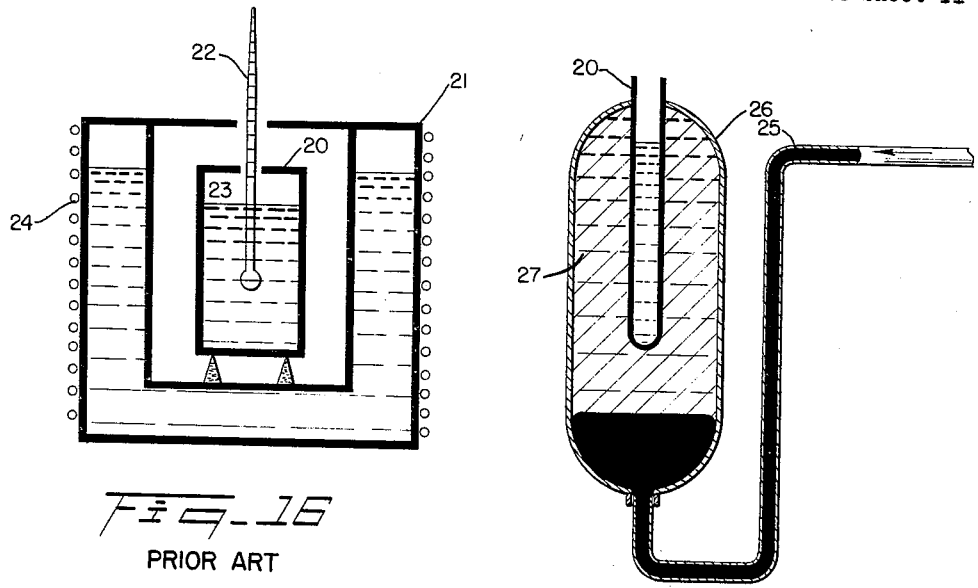
*Fig_16*
PRIOR ART
*Fig_17*
PRIOR ART
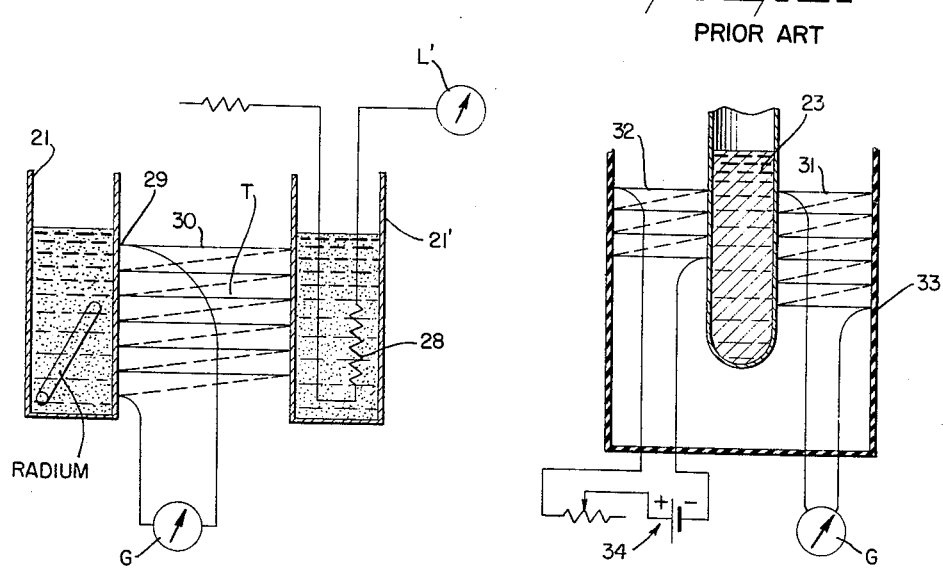
*Fig_18*
PRIOR ART
*Fig_19*
PRIOR ART
INVENTOR.
EDOUARD J. P. CALVET
BY
Bauer and Seymour
ATTORNEYS

United States Patent Office 3,059,471
Patented Oct. 23, 1962

3,059,471
CALORIMETER
Edouard J. P. Calvet, 22 Blvd. d'Arras,
Marseille, France
Filed Feb. 19, 1957, Ser. No. 641,223
9 Claims. (Cl. 73—190)

This invention relates to calorimetry and calorimeters, particularly to micro-calorimeters. The principles of the invention will be better understood after a review of the principal systems already in use. The drawings diagram the developments in calorimeters and illustrate the inventions of the present disclosure:

FIG 1 is a vertical section on line 1—1 of FIG. 2 through a calorimeter of the present invention, which will be called the Calvet type hereinafter.

FIG. 2 is a section on line 2—2 of FIG. 1.

FIG. 4 is a diagrammatic vertical section on line 4—4 of FIG. 3, through a Calvet cell.

FIG. 7 illustrates the pile connections for a differential microcalorimeter of two cells.

FIG. 8 illustrates the pile connections for an addition microcalorimeter of two cells.

FIG. 9 illustrates the pile connections for a four-cell Calvet microcalorimeter having an addition-differential hookup.

FIG. 10 is a vertical section on line 10—10 of FIG. 11.

FIG. 11 is a plan view of a novel, spiral wound insulator.

FIG. 12 is a diagram of electrical connections for a calorimeter which enable it to be set for low, medium, or high sensitivity.

FIG. 16 is a diagram of the adiabatic calorimeters of Berthelot and Richard.

FIG. 17 is a diagram of the isothermal calorimeter of Bunsen.

FIG. 18 is a diagram of the twin compensated calorimeter.

FIG. 19 is a diagram of the Tian calorimeter.

Figure 3A:
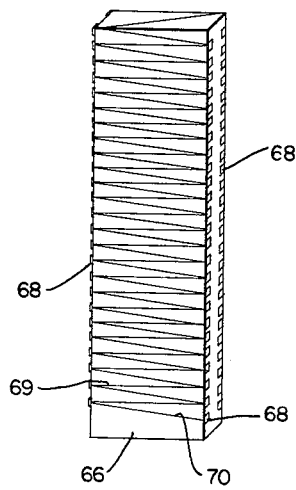
FIG. 3a is an elevation of a Calvet thermocouple pile.

The first calorimetric system, see FIG. 16, was the adiabatic of Berthelot in which the reaction vessel 20 was surrounded by a water-jacket 21, which was kept at a constant temperature so far as possible. This actually was not possible and the complications of computation were great. The exothermic was measured by a thermometer 22 in the reaction mass 23 and the temperature rise was proportional to the release of heat and modified by the heat losses through the reaction vessel wall.

About 1920, Richard invented the system in which the increase in heat due to the reaction activated an exterior heating means such as a coil 24, so that the temperature outside always was equal to that inside, so there could never be any loss of heat through the inner container and the release of heat in the reaction vessel 20 was a truer representation of the exothermic nature of the reaction.

The system of Richard had these faults that the complication of the system of control, which was accurate for limited periods of time, up to 6 hours for example, was not sufficient to equal the life span of microbes, or other life forms, whose reactions are to be studied, and that agitation was necessary, which created measurable heat, but was required in order to get uniformity of temperature release in the reaction vessel. It sometimes caused the reaction to proceed at a rate different from its natural rate of propagation.

A second type was the isothermal of Bunsen. In this type, see FIG. 17, the reaction vessel 20 was encased in ice and water; the ice would melt as the reaction gave off heat, and in melting would be of reduced volume. The capillary 25 was connected to vessel 26, which held the ice and water 27, and some mercury at the bottom. The end of the mercury column was displaced in the capillary tube 25 when the ice melted, the displacement of the mercury column being proportional to the quantity of melting ice and thus to the release of heat in the reaction vessel.

In the twin calorimeter of compensated-differential type, see FIG. 18, which is the most important of the three, two calorimeters 21—21' are used. In one 21 the reaction takes place, in the other 21' a resistance 28 is fed with current until the heat release of the one is exactly balanced as indicated by the galvanometer G, whose needle is displaced in one direction as the heat of the reaction (e.g. radium) raises the temperature of the joints 29 of the thermopile 30, which touch vessel 21. Current is fed to a Joule effect resistance 28 in the vessel 21' until the needle returns to zero. At this time a reading is taken at ammeter L' of the current being drawn by the resistance 28 and the increase in temperature is proportional to $Ri^2$.

The dificulty is that you have different phenomena generating heat, accompanied in 21' by the creation of convection currents, but not to the same extent in 21.

There are large expenses of vessel free to radiate away from the thermocouples. The system is too much affected by the location of the heat producing reaction in the vessel.

Also the thermic resistance of the joints in the thermocouple are not the same. More or less solder may be applied to one joint than to another and they will differ in their response to heat. The difference is important. Some agitated the mass to try to overcome these defects, but agitation is not desirable.

It is not a true method of zero because the temperature changes during the experiment. In the true zero method the temperature should remain constant. This is very important as the losses at different times and temperatures are not the same.

In the Tian calorimeter, see FIG. 19, one series of thermocouples 31 registers the release of heat on a galvanometer G, and another series of thermocouples 32 is supplied with current, producing a cooling effect. The current from source 34 is increased until the cooling equals the heat release, and the galvanometer returns to 0; the heat release is directly proportional, with some correction for Joule effect, to the current fed to the cooling thermocouples 32.

The cooling couples have terminals in contact with the reaction vessel and terminals in contact with an encircling body at constant temperature 33. They encircle the vessel. The heat thermocouples also have terminals encircling and in contact with the vessel.

Contrary to the classical adiabatic calorimetric methods, by which one tries to minimize as much as possible (or even to remove completely) the heat losses of the calorimetric cell, so as to limit the measurement of the amount of heat produced to that of the temperature rise of the mass undergoing the heating, the inventor tries to produce important heat losses which make the apparatus almost isothermal. We thus do not measure a temperature rise, but we estimate the lost heat flow by producing a proportional thermoelectric electromotive force registered as a function of time. The inventor has thus been able to obtain a sensitivity and an accuracy of the graph of heat flow lost vs. time to within less than 1 microwatt for nearly unlimited durations.

The registered curves allow us to determine, by integration, the amount of heat produced in a certain time interval. Yet, what still increases the interest of the novel apparatus, is the possibility of easily correcting the recorded curves to obtain curves representing the actual heat flow produced by the phenomenon, as a function of time, in other words the "thermokinetics" of the phenomenon, or in the case of a biological phenomenon, the "thermogenesis." The corrections are, by the way, often negligible in the case of slow phenomena.

As all phenomena are accompanied by thermal effects, thermokinetics become a very general and really sensitive and reliable means to study their evolution.

General Description of the Apparatus

The microcalorimeter of the drawings, which is illustrative of the principles involved, includes a large calorimetric metal block 35 which is provided with four cylindrical apertures 36, the cylindricality of which may be modified as later described, which constitute chambers for the reception of various instruments and vessels. The ends of the calorimetric block 35 are capped by thermal lenses 37, 38 which are lens shaped metal bodies of different heat conductivities, 37 being concave-plane and 38 being convex-plane, the plane face of lens 37 bearing against the plane end of block 35, and the plane face of lens 38 bearing against the plane base of a truncated metal cone 39. The curved faces of the two lenses are in engagement throughout. The conductivity of the metal of the thermal lens should be different from that of the object to which it transmits or from which it receives heat. The function of the lens-cone system is to secure an equal diffusion of heat from a transmitting to a receiving surface. I believe thermal lenses, and heat transmitting systems involving them to be new.

The ends of cones 39 are in contact with the flat ends 40 of a thick metal shell 41 of generally cylindrical nature the curved wall of which is spaced from the block 35. The assembly including the shell, the cones, the lenses, and the central block constitute a device for the uniform distribution of the thermal disturbances occurring within the apparatus.

The central metal block is provided with an even number of cavities to house an equal number of "microcalorimetric elements" 42. The microcalorimetric elements of a block are all identical and each constitutes an individual and independent calorimeter. These elements are associated in pairs for the purpose of avoiding the effects of the variations of the external temperature.

The inventor makes standard calorimeters with 4 elements so as to make possible either two simultaneous calorimetric experiments, or experiments of isothermal distillation from one element into the other, which calls for an additional-differential set up with 4 elements, as will be seen later.

Inside the thick-walled enclosure 41 there is a galvanometer G for each pair of calorimetric elements (or 2 galvanometers for the apparatus with 4 elements). The mirrors of these galvanometers receive the light from a source placed outside the apparatus, and reflect a light spot to photo recorders or to spot followers, not shown, also placed outside the apparatus. The light beams pass through orifices 43 in the multiple enclosures; these orifices are provided with glass shields 44 of an appropriate curvature.

A switch 45, placed inside the enclosure 41, and operated from the exterior of the apparatus, makes it possible to obtain different sensitivities and combinations. An adequate number of switches and galvanometers will be provided to secure all desired combinations.

All the circuits are arranged inside the enclosure 41 and are at the temperature of the thermostat. This arrangement is used for calorimeters working at temperatures below 50° C. With calorimeters working at higher temperatures (temperatures up to 1000° C. are common) it is of course necessary to place the galvanometers and the switches outside the apparatus in thermostats kept at an ordinary temperature. The electric wires connecting them to the calorimetric elements must not produce, then, interfering thermoelectric phenomena. For this purpose, the inventor uses heat-treated insulated copper wires in copper tubes, which work quite satisfactorily.

The shell 41 is mounted inside and in spaced relation to an enclosure 46 of metal which is encircled at the side and covered at the ends by multiple layers of thin metal 47 constituting an inclosure for uniform heat distribution, the layers of which are spaced apart.

The entire construction hereinbefore described is in turn mounted inside and in spaced relation to an enclosure 48 of metal about which is placed a heating or cooling coil 49, covering all sides of the enclosure. It is shown as an electric resistance wire wound about the enclosure. The enclosure is enveloped in a thick insulating body, having side walls 50 and a top 61, within an outer shell 51.

From the foregoing description it will be perceived that the apparatus may be analyzed into a number of component parts, a microcalorimetric element; an association of such elements; the system for equally distributing the heat of thermal disturbances; the thermostat; the arrangement of electrical circuits; the recording systems. In addition the invention involves processes of making calorimetric measurements of different kinds and at different temperatures and the novel method of calorimetry based on the release and redistribution of heat as distinguished from preventing its escape, and addition, differential, and addition-differential methods of calorimetry.

Within the general framework of the invention as above outlined are numerous inventions of detail or of dependent character which will appear as the description proceeds.

The Microcalorimetric Element

Seen from outside, the novel "microcalorimetric element" (FIG. 4) appears as a truncated cone 52 with a vertical axis, made of a good heat conducting metal, e.g. silver, copper or aluminum. This conical shape allows us to obtain a better thermal contact with the wall of the corresponding cavity in the central block 35. By screwing the ring 53 into the threaded upper part of the cavity, the element is tightly pressed against the wall of this cavity. The truncated cone 52 of the element is a thick-walled metal shell, whose internal surface 54 is a vertical coaxial cylinder. This surface will be called the external chamber of the element.

Inside, there is the cylindrical, thin silver socket 55, whose height is rather great with respect to the diameter (for instance $h=10d$). This silver socket is coaxial with the external chamber, closed at the bottom, and provided at the top with a flange by means of which it is fixed to a disc 56 made of a heat insulating material to keep it in place at the center of the microcalorimetric element. This disc is mounted in the external chamber and constitutes a horizontal diaphragm provided with a hole 57 at the center, corresponding to the orifice of the socket.

The outer surface of socket 55 will be called the internal chamber.

Inside the stationary socket 55 is placed the removable cell 58, in which the thermal phenomenon to be studied is produced; this cell we will call the microcalorimetric cell. It has the shape of the socket, and enters it with but a very slight friction, so as to fill in perfectly the inner surface. The part of the cell in contact with the socket has a very thin wall made of a metal resisting the effects of the contents; e.g. it may be of thin glass metallized outside.

The top of the cell, at the level of the socket orifice, is closed by a stopper 59, made of a heat insulating material, provided with a hole to allow the passage of the control rods 60 (made of glass or a plastic), which are used to start the calorimetric experiment.

The two chambers (internal and external) are connected by two thermoelectric piles $P_1$ and $P_2$ with a different number of thermocouples.

These thermoelectric piles are protected against humidity and the changes of the atmospheric pressure. For this purpose, they are placed in the closed air tight space between the silver socket and the external chamber extending upward to the disc 56 and downward to the closed base of the calorimetric element. The atmosphere of this space is desiccated by desiccating substances, which are not necessarily renewed, if the tightness is perfect. The use of anhydrous barita which absorbs water as well as carbon dioxide gas is recommended. It is placed within the outer chamber in the insulating enclosure 50, 61.

In Tian's apparatus, FIG. 19, as well as in the inventor's earliest models, one of the two piles is connected to a galvanometer so as to detect the temperature difference between the inner and outer chambers. The second one is connected to a source of electricity by means of a milliammeter or a microammeter and a rheostat, and used to produce a cooling down by the Peltier effect in the internal chamber, so as to compensate the heat flow released by the cell; we thus obtain a zero method.

But the arrangement of these two thermoelectric piles shows the following new characteristics which improve the reliability of these apparatus:

The two piles are alternated with or imbricated with each other in a perfectly regular way, and all the thermocouple elements, constituting the pile, are substantially identical as to their nature, shape, and thermal and electrical properties. The junctions consist of small plates applied to the external and internal chambers, but insulated from them electrically by a thin sheet of mica about 1/100 mm. thick; the junctions are substantially identical and arranged at equal distances from each other. This novel arrangement insures that, in any portion of the internal chamber, the ratio of heat flow lost by conduction in the two wires of a thermocouple element to heat flow lost in the space separating two junctions, is always the same. On the other hand, the whole of the surface of the internal chamber should be covered with thermocouples. If these two latter conditions are achieved, the electromotive force produced by the detector pile is always proportional to the total heat flow lost, whatever the temperature distribution inside the cell and on its surface.

Figure 3:
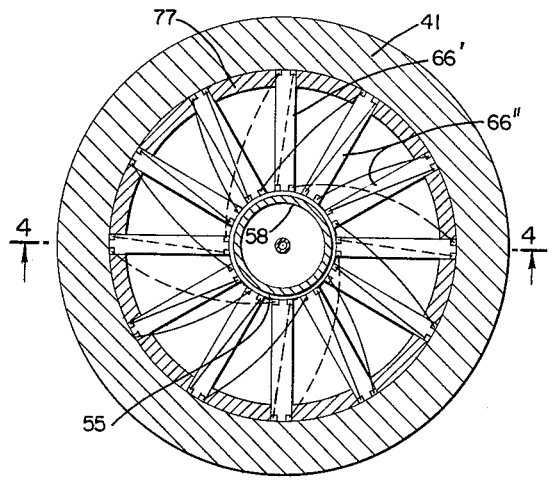
FIG. 3 is a horizontal section through a cell of Calvet type, taken on line 3—3 of FIG. 4, showing all piles in place.
Figure 3B:
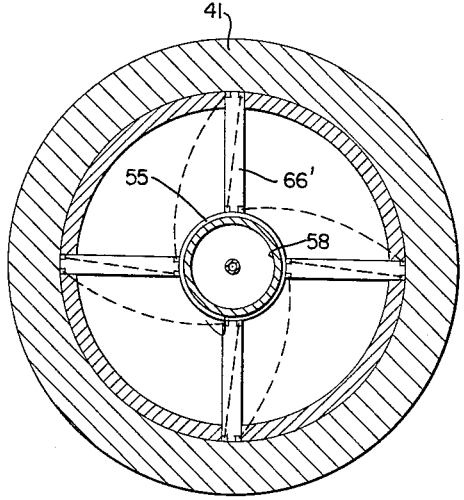
FIG. 3b is a horizontal diagram of the arrangement and connections of the short piles.
Figure 3C:
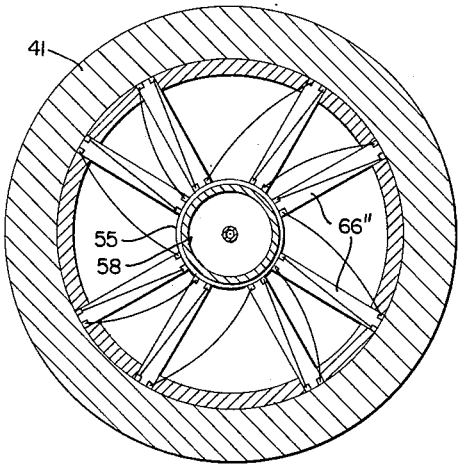
FIG. 3c is a horizontal diagram of the arrangement of the longer thermocouple piles.

To realize this important condition for a good reliability of the apparatus, the thermocouples surround the cell in a starlike or radial pattern, as seen in FIGS. 3, 3b, 3c.

We may arrange the thermocouples either on disc-shaped cakes 65 (FIG. 5), piled up around the socket, and separated from each other by an insulating material such as a disc-shaped sheet of mica, or on upright, rectangular supports radiating from the socket as shown in FIG. 3.

Figure 6:
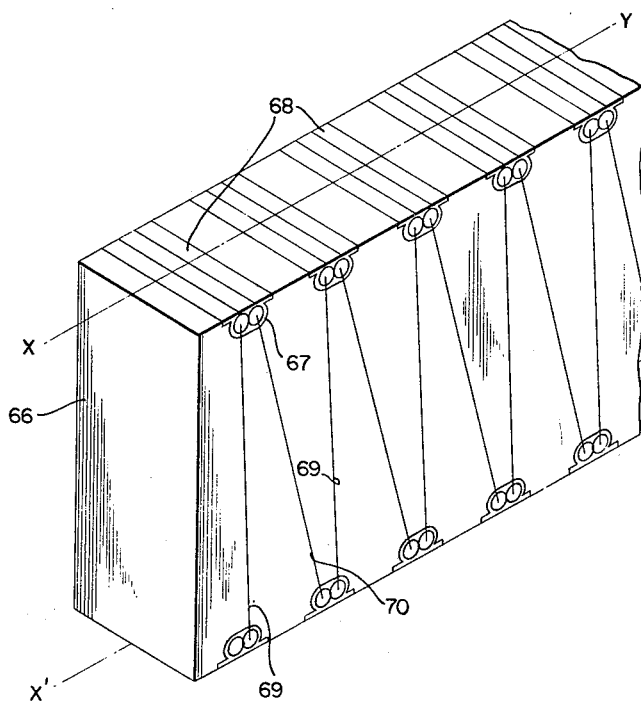
FIG. 6 is a partial perspective view, on enlarged scale, of pile construction.

Thermocouples have been made in various ways. The applicant has, in particular, adopted the following novel procedure for the vertical piles of FIGS. 3a and 6:

A rectangular metal plate 66 is used as a support, with regularly spaced notches 67, each provided with a small, inset silver plate 68 having the shape shown in FIG. 6. Then, a spiral of metal 69 and a spiral of metal 70 are coiled up on this support, so that the two metals pass alternately side by side through each notch, as shown in FIG. 6. After having first set the small silver plates in the notches, the outer face $c$ is then filled in by a silver solder. By an appropriate incision along the axis $xy$, $x'y'$ of the face of the metal plate used as a support, dividing the opposite faces of the metal block in half, one produces identical pairs, as shown in FIG. 3a. One obtains two identical thermoelectric piles, which are then removed from the support, and stuck to a thin sheet of mica. One of the pairs may be used with one cell and the other with the other cell, thus eliminating differences due to unbalanced thermocouples.

The top of the cell is not covered with thermocouples, this part being used for the introduction of the substances to be studied and the passage of the control rods to start or to stop the experiment. This portion, which is not covered with thermocouples, represents only a small fraction of the total surface of the cell (it is the fraction $d/4h$ of the lateral surface, $d$ being the diameter, and $h$ the height of the cell; it amounts to $1/40$ for $d=1$ cm., and $h=10$ cm.). Besides. it is easy to minimize the heat flow released by this portion by closing the cell with a stopper made of a heat insulating material. A thermocouple 71 may be inserted below the cell if desired.

All the designers of calorimeters seem to have overlooked the necessity to cover entirely and uniformly the outer surface of the calorimetric cell with thermocouples. The inventor has attached great importance to that condition, to make the apparatus reliable.

The invention may use a different number of couples for each of these two piles, which enables it to have two sensitivities, or the same number. When piles of one number of thermocouples are used in one cell and piles of a different number are used in the other cell, the role of detector, and the role of producing the Peltier effect of the two thermoelectric piles may be interchanged by means of the switch 45 (FIG. 1). When a high sensitivity is desirable to detect small thermal effects, one uses the pile with the higher number of couples as the detector pile; the compensation is then made by means of a small Peltier effect, which logically requires the use of the pile with the smaller number of couples. When, on the contrary, the thermal effect to be measured is important, the pile with the smaller number of couples is quite sufficient to detect it, and the pile with the larger number of couples is advantageous for its compensation.

Figure 12A:
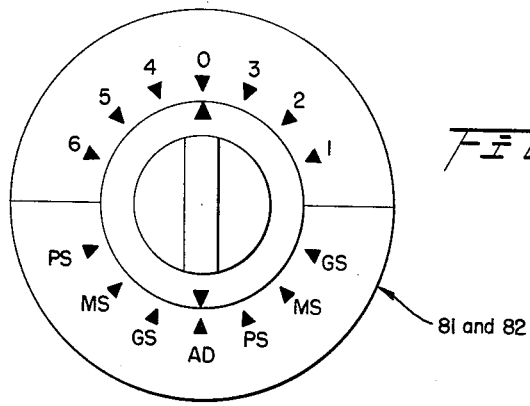
FIGS. 12a and 12b are individual diagrams of switches for FIG. 12.
Figure 12B:
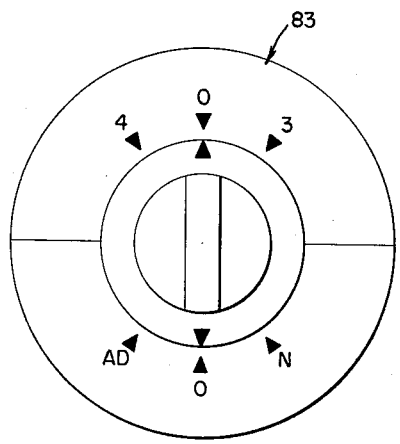

One may obtain additional, lower sensitivities by introducing some resistances in series into the circuit of the pile with the smaller number of couples. The lay-outs in FIGS. 12 and 13 show various switches and connections, e.g. producing high sensitivity by using the pile with the larger number of couples as detector, medium sensitivity by using the pile with the smaller number of couples as detector, and low sensitivity by introducing a resistance in series into the above mentioned circuit.

Figure 5:
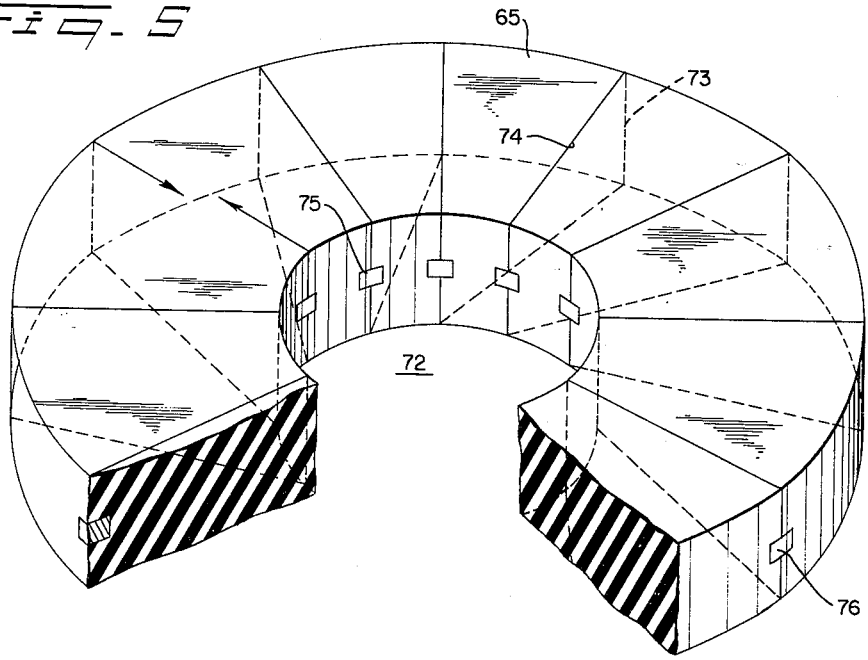
FIG. 5 is an alternative pile construction, partly in section.

In the disc type piles of FIG. 5 the insulating disc 65 is provided with a central hole 72 which is a snug fit for the reaction vessel or its sheath. The wires 73, 74 are different, e.g. Chromel and constantan, and are soldered together at 75 and 76, on the inside and outside of the disc respectively. These discs may be stacked about the reaction vessel in contact with it and the outer chamber.

It will be understood that the usual choices of wire may be resorted to in making the piles. For instance 69 may be Chromel and 70 constantan, or 69 may be iron and 70 copper.

The Association of the Microcalorimetric Elements

The association of the microcalorimetric elements is carried out by connecting the terminals of the thermoelectric detector piles as if we were dealing with ordinary galvanic cells.

Let us call $I_1$, resp. $I_2$ . . . the terminals of the detector piles 1 and 2, coming from the last internal junction, and $E_1$, $E_2$ . . . the terminals coming from the last external junction.

(a) The association in opposition or differential set up of two elements 1 and 2 is obtained by connecting $I_1$ and $I_2$ or $E_1$ and $E_2$, the remaining poles being connected to the galvanometer.

This kind of association is fundamental, as it enables us to make our apparatus independent of the variations of the external temperature, if these variations are uniformly distributed on the two elements in opposition. In fact, the variations of the external temperature produce then the same electromotive forces in each of the elements in opposition, and these electromotive forces balance each other at any time.

By grouping in opposition each pair of elements of a microcalorimetric block, it is possible to carry out as many simultaneous experiments as there are pairs of elements in this block. But it is also possible to realize other, very interesting associations.

Figure 14:
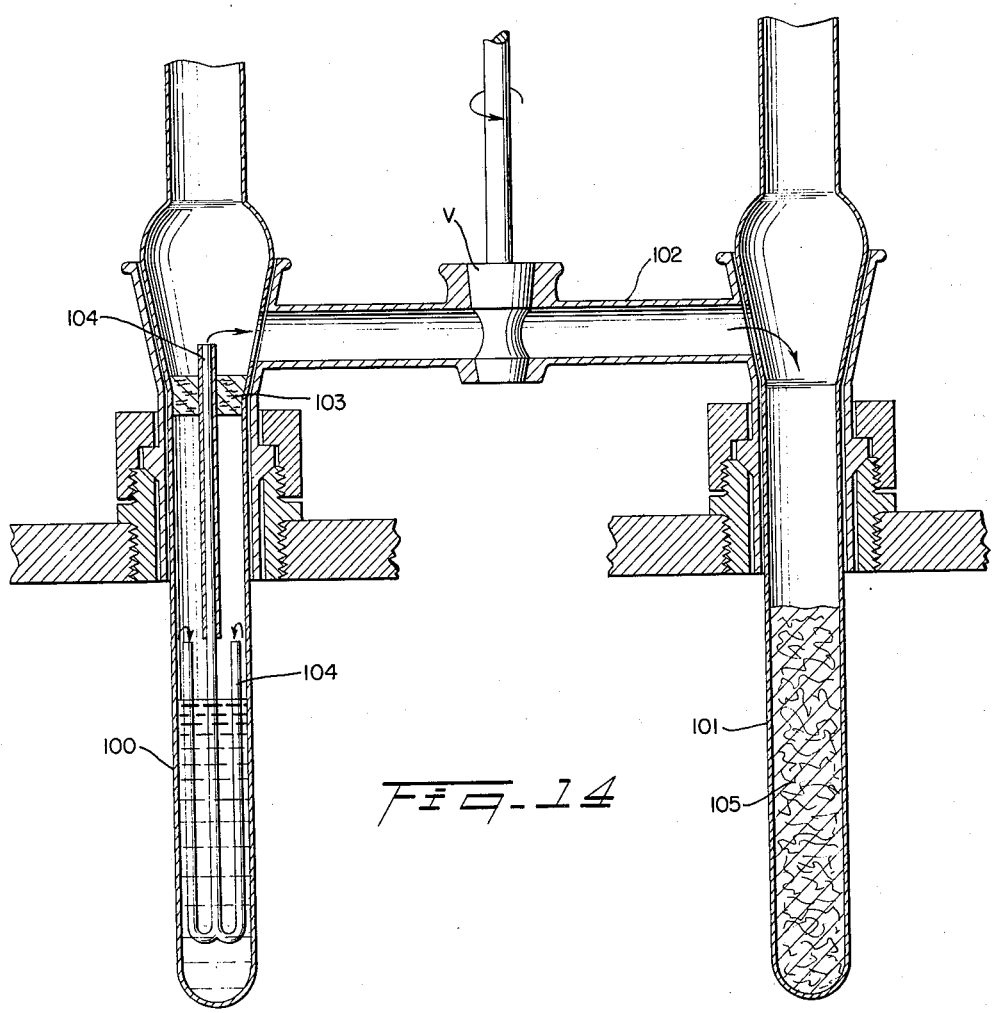
FIG. 14 is a vertical section through the cells in operation during an absorption determination.

(b) The association in series or additional set-up is obtained by connecting $I_1$ and $E_2$ (or $E_1$ and $I_2$), the remaining poles being connected to the galvanometer. The inventor has used this set-up to study phenomena involving the isothermal distillation of the content of one cell (1) into another (2). He has used it, for instance, to measure the heat of adsorption of a liquid placed in cell 1 on a solid placed in cell 2 after an intermediate stage of vaporization of the liquid. An apparatus for the study of an absorption phenomenon, which is shown in FIG. 14, is described hereinafter. The additional set-up thus allowed him to evaluate the algebraic sum of two thermal effects, one being negative (vaporization of the liquid), the other being positive (condensation on the adsorbant); this finally represents the heat of adsorption of the liquid on the solid adsorbant.

This additional system is twice as sensitive to the variations of the external temperature as an individual element.

(c) To avoid this shortcoming, we are obliged to realize two identical additional systems (one of them being used as a reference system), and to group them in opposition. For that purpose, we must finally use 4 identical elements grouped in an additional-differential set-up.

This set-up has still another advantage; it allows us, through the use of the second pile of the laboratory-element, to detect the thermal effect produced by the vaporization of the liquid, or the thermal effect produced by the condensation on the adsorbant. To make the recording of such a thermal effect independent of the variation of the external temperature, it is necessary to couple the element corresponding to this recording with one of the elements of the pair used as reference system, according to the differential set-up. One will note that the recording of the flow of the heat of vaporization of this liquid corresponds, within a constant (which is the latent heat of vaporization of this liquid), to that of the flow of adsorbed vapor. The area of the recorded curve is thus proportional to the weight of the adsorbed liquid, and the calorimeter becomes a balance for continuous weighing.

One may note that no balance can work with such precision; in fact, the inventor commonly registers heat flows of one $\frac{1}{1000}$ calorie per hour, which corresponds to a vaporization of $\frac{1}{600,000}$ gr. water per hour.

Referring to FIGS. 3 to 3c, the piles 66 are arranged radially in contact with the walls of the inner and outer chambers, being held in position by spacers 77. In assembling the calorimeter, short piles 66' may be arranged and connected as shown in FIG. 3b. Thereafter, long piles 66" may be arranged and connected as shown in FIG. 3c. The composite cell is shown in FIG. 3, having four short and six long piles. The pile is short or long depending on the number of thermocouples on its face.

The arrangement of a two-cell, $C_1C_2$, calorimeter of differential hookup is shown in FIG. 7 in which G is a galvanometer connected by lines 78—79 to the respective piles 66' and 66", which are connected by line 80 at the faces touching the inner chambers.

In FIG. 8 the connection 80' is attached to the inner face of one pile and the outer face of the other, producing an addition hookup.

FIG. 9 is the diagram of an addition-differential, four-cell calorimeter having two galvanometers and cells $C_1$, $C_2$, $C_3$, $C_4$. The addition-differential set-up of the four cells is shown in solid lines. An additional, differential set-up of cells $C_1$ and $C_4$ is shown in dotted lines. The connections of FIG. 9 will be comprehended by skilled persons without reference numerals or further description.

The switch 45 or a plurality of switches, enables one to make the switching combinations of FIG. 13. The galvanometer may be thus connected with the piles to obtain three sensitivities, a current source such as a storage battery may be connected with the thermocouples which produce the Peltier effect (cooling), and the addition, the differential, and the addition-differential hookup may be selected.

Figure 12C:
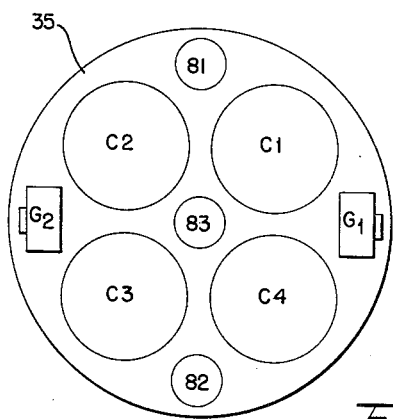
FIG. 12c is a diagram of the top of a four-cell calorimeter showing the location of switches and galvanometers.
Figure 13:
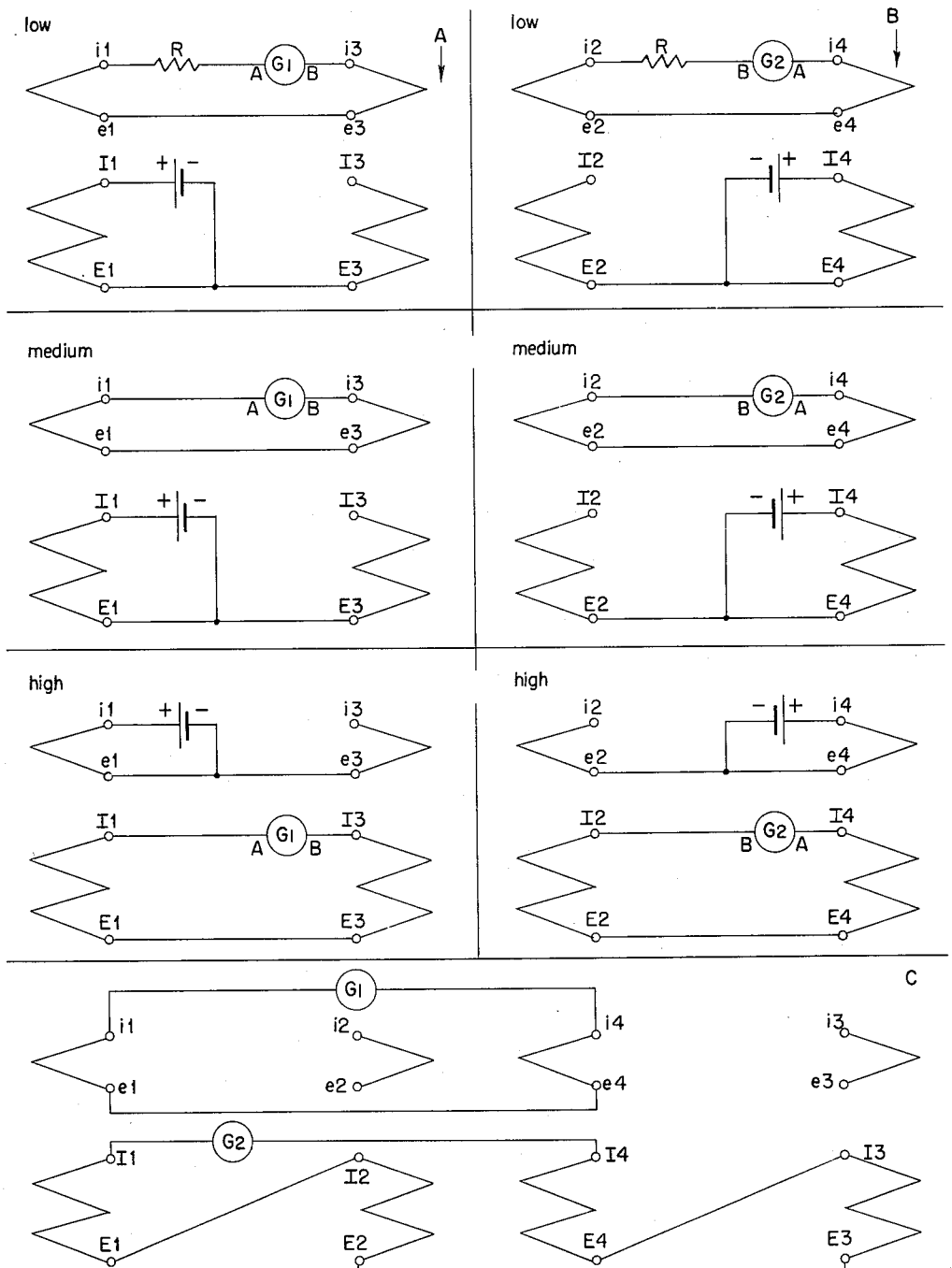
FIG. 13 shows 7 hookups, a to g inclusive, demonstrating the extreme versatility of the Calvet calorimeter with the available circuits of FIG. 12.

FIG. 13 shows a diagram of switching combinations which may be obtained with a calorimeter consisting of 4 cells $C_1$, $C_2$, $C_3$, $C_4$ by operating the three switches 81, 82, 83 of FIG. 12c (which may be replaced by the one switch 45 shown in FIG. 1).

The small letters $i_1$, $i_2$ and $e_1$, $e_2$ correspond to the last internal and external junctions of the pile with the smaller number of couples, this pile being represented by a lying V. The big letters $I_1$, $I_2$ and $E_1$, $E_2$ represent the last internal and external junctions of the pile containing the larger number of couples, this pile being represented by a lying W. The additional resistance, which allows us to obtain the low sensitivity, is represented by R.

In the three sketches of group A, FIG. 13, the cells numbered $C_1$ and $C_3$ of FIG. 12c are twin-coupled.

The low sensitivity is obtained by connecting $e_1$, $e_3$, while $i_1$ is connected to A of the galvanometer through the additional resistance R and $i_3$ to B. Element 1 is considered as the laboratory-cell, and element 3 is used as reference element; the Peltier effect is hence only applied to the pile with the larger number of couples of element 1 by connecting $I_1$ and $E_1$ to the + and − poles of a generator (a rheostat is also placed in this circuit).

The medium sensitivity is obtained similarly, but without the additional resistance R.

The high sensitivity is obtained by connecting $E_1$ and $E_3$, while $I_1$ and $I_3$ are connected to the posts A and B of the galvanometer. The Peltier effect, still applied to the laboratory-element number 1, but this time to the pile with the smaller number of couples of this element, is obtained by connecting $i_1$ and $e_1$ to the + and − poles of a source of a direct current.

In the three sketches of B, the elements 2 and 4 are coupled. Element 4 is considered as laboratory-element, and element 2 as reference element.

In this diagram we find:

The low sensitivity, obtained by connecting $e_2$ and $e_4$, while $i_2$ and $i_4$ are connected to the terminals B and A of the galvanometer through the additional resistance R.

The Peltier effect is then applied to the terminals $I_4$ and $E_4$ of the pile with the larger number of couples of cell $C_4$.

The medium sensitivity is obtained similarly, but without the additional resistance R.

The high sensitivity is obtained by connecting $E_2$ to $E_4$, while $I_2$ and $I_4$ are connected to the terminals B and A of the galvanometer. The Peltier effect is then applied to $i_4$ and $e_4$ of the pile with the smaller number of couples of cell $C_4$.

In the set-up of FIGS. 9 and 13c, we have associated in series (additional set-up) the piles with the larger number of couples of the cells 1 and 2 by connecting $E_1$ and $I_2$. The piles with the larger number of couples of the cells 3 and 4 are similarly associated by connecting $I_3$ and $E_4$.

These two addition systems are grouped in opposition by connecting $E_2$ and $E_3$, while $I_1$ and $I_4$ are connected to A, and B respectively of galvanometer $G_2$.

This system allows us to add up the thermal effects produced in the laboratory-elements $C_1$ and $C_2$, while the group of elements $C_3$ and $C_4$ is used as reference system.

On the other hand, the differential set-up of the piles with the smaller number of couples of the element 1 and 4 (by connecting $e_1$ and $e_4$, while $i_1$ and $i_4$ are connected to galvanometer $G_1$) allows us to register the heat flows produced exclusively in the laboratory-element 1.

It is not necessary to achieve isothermal conditions, in the course of time, of the external chambers of the twinned calorimetric elements in the differential system. It suffices to realize at any moment the same temperature distribution on the external chambers of these twinned elements; this temperature distribution may vary in the course of time. This simplifies considerably the problem of the stability of the experimental zero of the apparatus.

The two microcalorimetric elements being placed in symmetrical cavities with respect to a plane passing through the vertical axis of the central cylindrical metal block, it suffices to achieve the thermal homogeneousness of this block, or simply a symmetrical distribution of the temperatures with respect to this vertical plane.

It will be noted, in fact, that the symmetry of the temperature distributions on the external chambers of the twinned elements is not affected by the thermal variations directed along the vertical axis of the block, while it is modified by lateral thermal disturbances, which do not follow the direction of the plane of symmetry.

The lateral thermal disturbances, which affect a portion of the external wall of the calorimeter, are largely diffused by the multiple enclosures before reaching the last thick wall which surrounds the calorimetric block. But in spite of this large diffusion, there will exists, though lessened, a radial disturbance of maximum intensity, whose effect is the more sensible the more it deviates from the plane of symmetry of the block.

In short, the mere use of multiple enclosures is insufficient to free the central block completely from the influence of the lateral disturbances. For this reason the new calorimeter distributes the local thermal disturbances uniformly on the whole periphery and converts these disturbances into axial disturbances for which the symmetry is always realized. In order to achieve this result one may resort to the introduction of a water-jacket between the thermostat of multiple enclosures and the calorimetric block, the water being agitated so as to obtain a horizontal circulation to distribute the thermal disturbances on the whole periphery, but mechanical agitation always involves some heating, difficult to avoid, and needs constant watching, which is very troublesome for lengthy experiments. The inventor, therefore, prefers to discard any mechanical agitation, using instead, adequate stationary metallic masses.

The preferred solution to the problem is that the calorimetric block is placed between two cones made of the same metal, the truncated summits being applied to the horizontal bases (bottom and top base) of a rather thick metal cylinder (see FIG 1).

The lateral thermal disturbances are conducted by the walls of the thick metal cylinder to the truncated summits of the metal cones, and from there they are symmetrically distributed on the bases of the central calorimetric block. It is desirable to distribute them uniformly on these bases, so that they may affect the whole of the couples of each calorimetric element, and not only one portion. We have devised a kind of collimator whose focus is to be at the summit of each equidistribution cone, and the lens at the surface separating the cone from the central metal block. The inventor has designed such thin-edged lenses, made of a poorer heat-conducting metal than the cones and the central block. The calculation of the meridian of the surface of such a plano-convex thermal lens does not involve any difficulty. It results in a parabola.

Let us consider, for instance, a central metal block made of copper, 26 cm. in diameter and copper cones with an angle of 60° at the summit, the cones being truncated at 3.5 cm. from the summit. For this particular case, the thin-edged lens, made of a special steel whose coefficient of conductivity is 0.048, is found to be 20 mm. thick at the center. With such thermal lenses, the uniformity of the temperature on the bases of the block is properly achieved.

It is not necessary to build a high precision thermostat if the system for a uniform distribution of the thermal disturbances in the calorimetric block is judiciously devised. A thermostat assuring the uniformity of temperature to within a few $\frac{1}{1000}$° C. is quite sufficient.

We avoid the use of mechanical stirrers or pumps, which may create some abnormal heatings; besides, they need a certain supervision. It is preferable to use stationary metallic masses whenever this is possible.

Calorimeters Working in an Ordinary Temperature Range

This is the case for the apparatus shown in FIGS. 1, 10 and 11. The thermostat consists of a series of concentric, cylindrical enclosures 90 made of a good heat conducting metal (copper or aluminum) and separated from each other by a thin interval of air. Such a system of multiple enclosures is readily made by rolling up a cylinder a sheet of aluminum (the breadth of which is equal to the height of the thermostat), and by coiling up, at the same time, wires 91 which keeps the spirals apart and prevent vertical convection of air between these spirals.

On the outer side of these multiple enclosures are arranged electric heating resistances and tubular coils 49 for the circulation of the cooling liquid, not usually desirable to use.

The heat regulating apparatus (thermoregulator) consists of a mercury electro-contact thermometer or an electro-resistance thermometer constituting one of the 4 branches of a Wheatstone's bridge; it is in good thermal contact with the first enclosure of the multi-enclosure system. This is a classical Wheatstone arrangement and needs no description.

The thermostat is protected by a thick layer of a heat insulating material.

The electric heating is obtained partially by the passage of a current of constant intensity, and partially with the help of a discontinuous current, controlled by the thermoregulator. When the thermoregulator is a mercury contact thermometer, it is placed in the circuit of an electronical relay which shuts or opens the heating circuit. The mercury contact thermometer, which has the advantage of being very simple, is quite satisfactory from the viewpoint of the steadiness of the experimental zero of the apparatus.

The inventor also uses continuous heating systems in which the calorific power is controlled by the disequilibrium of a Wheatstone's bridge fed with an alternating current. The disequilibrium current is then electronically amplified and applied to a thyratron through a mixing-dephasing system to produce the signal for the direct current which is to heat the thermostat.

These heat regulating systems are classical.

Calorimeters Working at Low Temperatures

When the temperature of the calorimeter is not higher than 60° C., it is very advantageous to place all the circuits of the thermoelectric piles inside the thermostat, together with the galvanometer and the switches. It is thus possible to avoid interfering thermoelectric electromotive forces caused by the heterogeneousness of the different conductors.

When working at low temperatures, one makes a cold liquid circulate in a coil or in a jacket surrounding the calorimeter. As it is rather difficult to regulate precisely the temperature of this liquid, the cooling system is superposed by an electrical heating with a thermoregulator which keeps the temperature constant at 1 or 2 degrees above the temperature of the cooling jacket.

A particular difficulty stems from the condensation of humidity on the cooled apparatus, which makes it necessary to place the apparatus in a closed casing kept in a sufficiently low hygrometric state.

Calorimeters Working at High Temperatures

The applicant has built, on the same principle as for his apparatus working at ordinary temperatures, microcalorimeters for high temperatures; up to 1200° C. for instance.

The microcalorimetric blocks are made of a refractory steel, molybdenum or tungsten. The thermoelectric piles are made of platinum and a platinum-rhodium alloy for high temperatures. The inventor also uses chromel-alumel couples for temperatures up to 800° C. The heat insulators are made of magnesia or sintered alumina. The cells are made of platinum.

The calorimetric apparatus is placed in a cooling jacket, and the cooling is obtained by water circulating between the two shells. One may apply a vacuum to the interior of the enclosure, or make a gas circulate, which allows to work in a conditioned atmosphere.

The latter apparatus are very new. They make it possible to carry out a quantitative differential thermal analysis by increasing the temperature linearly as a function of time. They have still another advantage, namely to allow the recording of the kinetics of a phenomenon and the measurement of the amount of heat produced at a given temperature.

The inventor recently used them for the study of the allotropic changes of alumina, and the results obtained will soon be published.

The Recording Systems

The recording of the electromotive force of the detector thermopile as a function of time corresponds, within a constant of proportionality, to the uncompensated heat flow emanating from the cell as a function of time.

To obtain this recording, we insert a very sensitive galvanometer into the circuit of the detector pile. The moving slot-shaped light spot, reflected from the mirror of the galvanometer is recorded on a cylinder provided with a photographic paper or followed by means of a spot follower, consisting essentially of a photoelectric cell (such as the Beckman photopen in America) or of a photo-resistance cell (of the Sefram type in France). The spot followers allow the recording by means of a pen and have the great advantage to yield a curve which is visible as it is drawn.

The use of a very sensitive galvanometer, resulting in a 1 mm. deviation on a scale placed at 1 meter from the mirror for a current of an intensity of $2 \times 10^{-10}$ amperes allows thus to reveal, for a 1 mm. deviation, a variation of the electromotive force of $2 \times 10^{-8}$ volts for a 100 ohms resistance of the circuit.

The Absolute, Automatic Compensation Through the Peltier Effect

It is easy to control the compensating Peltier effect by the deviations of the galvanometer, so that the latter are always null. This absolute compensation is unnecessary; it involves new causes of inaccuracy due to the control system, and replaces the recording, often very regular, of the electromotive force of the detector pile, by the recording, often oscillatory and complicated, of the intensity of the compensation current. The inventor prefers to carry out a compensation which, though being approximate, is however measured with a high precision by means of good potentiometers. The uncompensated fraction is estimated by measuring the area of the recorded curve.

For instance, after a preliminary experiment, involving no compensation, one may calculate the average value of a constant Peltier compensation current, for a long duration, so that the positive and negative portions of the area of the recorded curve are approximately equal. If the uncompensated fraction is only $1/10$ of the compensated fraction, and if the measurement is carried out to within 1%, the resulting error is only one $1/1000$ of the total amount of heat produced. The precision becomes then excellent, as the compensated fraction, which represents $9/10$ of the total heat produced, is known very precisely.

Examples of the Operation of the Apparatus and Experimental Procedure

Let us consider two microcalorimetric elements arranged in opposition (differential system) in the block, which assures a uniform distribution of the thermal disturbances.

Let us insert now into the sockets of these two calorimetric elements identical cells containing substances having the same thermal diffusivity. One of these cells will be used as reference cell; that means, it will never be the seat of thermal effects of its own; the only causes of the variations of its temperature in the course of time will be due exclusively to the variations of the temperature of the calorimetric block. These causes, which affect identically the two calorimeters, whose detector thermopiles are in opposition, produce equal thermo electric currents of opposite sign, which have no effect on the deviation of the galvanometer placed in the circuit of the detector piles.

The other cell is used as laboratory; that means, it will be the seat of the thermal phenomenon to be studied.

During the preliminary stabilization period preceding the start of the experiment (and which lasts a few hours, though its duration can be reduced by the use of the Peltier effect), the laboratory cell does not produce any thermal effect of its own; the temperature of the two cells become equal which results in a constant, though weak, deviation of the galvanometer spot with respect to the position of the latter in open circuit. This constant deviation defines what we call the experimental zero of the apparatus. A most remarkable property in the inventor's latest apparatus is the absolute stability of this experimental zero for very long periods; its variations remain, in fact, below a deviation which would be the result of a temperature difference of less than $1/4,000,000°$ C. between the two cells for more than a month. It is this fundamental property which is, in the inventor's opinion, the most valuable feature of the apparatus.

One registers, first, the experimental zero, and when this is constant, the calorimetric experiment is started by a very simple operation: by breaking the tapered point of bulbs containing the reactants, with the help of a stopcock controlled from outside, etc. The deviations $\Delta$ of the galvanometer spot are registered as a function of time $t$.

The deviation $\Delta$ of the galvanometer spot is proportional to the total heat flow $\phi$ lost at any moment by the laboratory cell.

In fact, the total flow of lost heat is partially conducted by the thermocouple wire, and partially dissipated by conductivity, convection, or radiation in the space between these wires. Let us suppose the following conditions are achieved:

(1) The thermoelectric couples are all identical.

(2) Their number is high enough to surround completely the cell.

(3) They are regularly enough distributed around it, so that the ratio $\lambda$ of the flow conducted by the wires to that which is dissipated by the lateral portion remains the same for each element of the cell wall. The electromotive force produced by the whole pile is then proportional to the total heat flow lost, and independent of the temperature distribution in the interior and on the cell walls; this is due to the fact, that for each elementary portion of the cell surface, the electromotive force of the couples corresponding to that portion is proportional to the heat flow emanating from it. As the couples are arranged in series, the electromotive forces are added up, and this sum represents proportionally the total heat flow emanating from the cell.

This integration of the flow emanating from the cell is a further important feature of the novel apparatus.

Finally, we have at any instant the relation $$\phi = K\Delta$$

(K being a proportionality constant).

*Case of a Constant Heat Flow Produced in the Interior of the Cell (steady state)*

If we produce a constant heat power W in the interior of the laboratory cell, the temperature of this cell rises; the lost heat flow $\phi$ increases simultaneously, and after a certain time, becomes equal to the constant heat power W produced; the deviation $\Delta_m$ remains then constant, and we obtain also $$\phi = W = K\Delta_m$$

*Approximate Theory of the Apparatus for the Application to Slow Phenomena (Unsteady State)*

Let us call W the instantaneous heat power produced in the cell at time $t$, and $\theta$ the average temperature difference at that instant between the external and the internal chambers.

One part of the heat power W, let us call it $p\theta$, is lost in the form of a heat flow emanating from the cell, while the other part is used to raise the cell temperature by $d\theta$ in the time interval $dt$. In a first approximation, we will suppose the temperature of the cell is uniform. By calling $\mu$ the heat capacity of the cell, we have:

$$W = p\theta + \mu \frac{d\theta}{dt} \quad (1)$$

The deviations $\Delta$ of the galvanometer light spot being proportional to $\theta$, or $\Delta = g\theta$ we may express (1) by $$W = \frac{p}{g}\Delta + \frac{\mu}{g}\frac{d\Delta}{dt} = \frac{p}{g}\left(\Delta + \frac{\mu}{p}\frac{d\Delta}{dt}\right) \quad (2)$$

When the heat power W is partially compensated by an opposite power W', produced by a Peltier effect or by a Joule effect in the laboratory cell, W has to be replaced by $W - W'$ in the first member of Equation 2.

The preceding theory assumes that the thermal uniformity of the contents of the microcalorimeter cell is achieved at any instant; that condition could only prevail if the thermal conductivity of the cell contents were infinite. Actually, the temperatures at the different points of the cell contents do not agree with those of the junctions at the internal chamber. We say that there is a thermal disequilibrium.

We call heat of thermal disequilibrium $q$ the amount of heat which would be released by the cell, if its content had taken up the temperature of the wall (internal chamber), assuming the conductivity had suddenly become infinite.

The measurement of this heat of thermal disequilibrium is carried out in the following way:

By a Peltier effect, we compensate exactly a Joule effect of a constant power W produced in the cell. Then, we cut off simultaneously the two contrary effects. The Peltier effect stops then immediately, while the heat of disequilibrium $q$ is slowly released to the exterior.

We record a curve whose area is $q$.

Experience, as well as theory, shows that $q$ is proportional to W. We call coefficient of thermal disequilibrium D, the constant ratio $$D = \frac{q}{W}, \text{ yielding } dq = DdW \quad (3)$$

The existence of the thermic unbalance "$q$" is translated by an apparent increase of the real calorific capacity: "$\mu$." The latter becomes $\mu + D_p$. The fundamental equation $$(1) \qquad W = p\theta + \mu \frac{d\theta}{dt}$$

remains valid by replacing $\mu$ by $\mu + D_p$.

Figure 15:
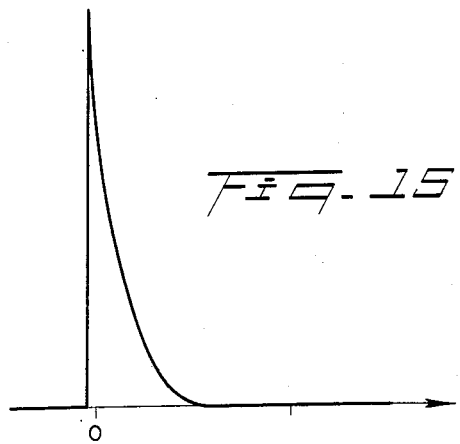
FIG. 15 is a diagram of thermal shock made by a Calvet calorimeter.

The recorded curve shown in FIG. 15 is that of an instantaneous evolution of heat. It has a peak, whose ordinate is proportional to the total quantity of the heat involved; that is why we may call this phenomenon a ballistic shock. The harmonic analysis of this curve, which gives the temperature difference $\theta$ between the two chambers, internal and external, of the laboratory-calorimeter as a funtion of time $t$, shows that we are dealing with a sum of exponentials, the time constants of which are very rapidly decreasing.

The ballistic curve obtained with a heat source of power W, acting for a very short time $du$, under the condition $\theta_{(t=0)}=0$ is explained with an excellent precision by the expression $$d\theta = Wa[\exp(-\omega_1 t) - \exp(-\omega_2 t)]du \quad (4)$$

where only two exponentials are conserved ($a$ is a constant).

For a heating of a finite duration $u_0$, we have $$\theta = Wa \int_0^{u_0} [\exp(-\omega_1(t-u)) - \exp(-\omega_2(t-u))]du$$

which leads again to a sum of two exponentials of time constants $\omega_1$ and $\omega_2$, namely:

$$\theta = \alpha \exp(-\omega_1 t) - \beta \exp(-\omega_2 t) \quad (5)$$

where $$\alpha = Wa\left(\frac{\exp(\omega_1 u_0) - 1}{\omega_1}\right); \beta = Wa\left(\frac{\exp(\omega_2 u_0) - 1}{\omega_2}\right) \quad (6)$$

It is thus possible to deduce from any experiment, for which we know $u_0$ as well as the corresponding coefficients $\alpha$ and $\beta$, the coefficients $\alpha'$ and $\beta'$ for another heating time $u'_0$.

The equations thus obtained verify very well the recorded experimental curves. They allow, in particular, the calculation of the time $t_m$ to attain the maximum, as well as of the maximum temperature $\theta_m$ attained.

By forming $$\frac{d\theta}{dt} = 0$$

in (5), we find in fact:

$$t_m = \frac{1}{\omega_1 - \omega_2} \log_e \frac{\exp \omega_1 u_0 - 1}{\exp \omega_2 u_0 - 1} \quad (7)$$

this shows that for the small values of $u_0$, $t_m$ takes up the constant value $$t_m = \frac{1}{\omega_1 - \omega_2} \log_e \frac{\omega_1}{\omega_2}$$

and when the $u_0$ value becomes very large, $t_m$ becomes equal to $u_0$.

When replacing $t$ in (5) by $t_m$ given in (7), and by forming $\omega_1=\omega$ and $\omega_2=n\omega$, we find:

$$\theta_m = \frac{n-1}{n\omega} Wa(\exp \omega u_0 - 1)^{\frac{n}{n-1}} (\exp n\omega u_0 - 1)^{-\frac{1}{n-1}} \quad (8)$$

The last factor in the expression becomes rapidly equal to 1. The curve of $\theta_m$ as a function of $u_0$ tends asymptotically toward a limit $\theta_p$ whose value is $$\theta_p = \frac{n-1}{n\omega} Wa$$

which is the steady state temperature for a power $W$ developed in the cell.

It is most remarkable to be able to calculate the constants of the calorimeter by the simple analysis of a recorded curve of the ballistic shock, and in particular, the most important of these constants, namely the ratio of the deviation obtained in a steady state to the corresponding constant power $W$.

With this apparatus, the inventor has found that $$n = \frac{\omega_2}{\omega_1}$$

is approximately 20. That is why we may neglect the second exponential term (1) in the case of low operating rates, which permits the very reliable use for the fundamental Equation 6.

For comparatively high operating rates, it is now possible to use the inventor's apparatus by using the more complete Equation 5.

FIG. 12 shows the connections for a 4-cell microcalorimeter having 2 galvanometers G, and with all the capacity for variation hereinabove described. FIG. 12c shows the arrangement of the cells and switches; the switch 81 controls cells $C_1$ and $C_3$ which have a differential hookup; the switch 82 is connected to cells $C_2$ adn $C_4$ which are connected in an addition circuit, and switch 83 produces the addition-differential hookup with all 4 cells and, in addition, a differential hookup with cells $C_1$ and $C_4$. This can be followed in FIG. 9. In achieving these hookups, the connections shown in FIG. 12 can be used, it being understood that switches 81 and 82 are constructed on the principle of FIG. 12a, whereas switch 83 is constructed on the principle of FIG. 12b.

The letters on FIG. 12a have the following significance: GS means great sensitivity, MS means medium sensitivity, PS means low sensitivity, AD means the addition-differential hookup.

On FIG. 12b, N means normal, AD means addition-differential and 0 means zero.

In FIG. 14 is an apparatus for the study of an adsorption phenomenon, including a reaction vessel 100 and adsorption vessel 101, a valve conduit 102 connecting the two vessels at a distance such that they will be received snugly in the silver sleeves of the cells. The vapor from the reaction mass in vessel 100 rises into the space below the stopper 103, enters the tube 104 and is discharged at the inlet of conduit 102 from whence it passes the valve V and enters the vessel 101 where it is adsorbed by the adsorbent 105.

The apparatus records accurately the total heat flow lost by a laboratory-cell, in which the thermal phenomenon to be studied is produced, as a function of time, and it is from this curve that the heat power produced at any moment (thermokinetics) and the total amount of heat released for a given time interval are calculated.

The total heat flow lost by the cell produces an electromotive force in the detector thermopile, and this electromotive force is independent of the temperature distribution in the interior and on the cell walls, when the following conditions exist:

(1) High enough number of thermoelectric couples, to make it possible to surround the cell completely by the internal junctions.

The optimum number of couples yielding the highest sensitivity may be obtained by a simple calculation, published by the inventor in another paper.[1] The ratio of couples of the short to the long piles has been used in ranges from 2 to 10 but these are facts, not limits.

(2) The thermocouples have to be identical as to their nature, their shape and the thermal and electrical constants. This assumes a radial arrangement of these couples and leads to the construction of independent calorimetric elements; which means that it is necessary not to connect directly the calorimetric elements arranged in opposition by thermocouples going alternately from one to the other of these elements.

(3) The ratio of the heat flow conducted by a thermocouple element to that which is lost through the interval separating this element from its neighbor, must be constant for all the elements of the thermoelectric pile.

The preceding conditions insure the accuracy of the apparatus.

On the other hand, to construct an apparatus working as an oscillograph with a low time constant, it is necessary to increase the thermal losses by increasing the number of couples, and to reduce the heat capacity of the whole system heated. We are accordingly led to adopt metallic cells of small diameter and internal junctions having a very weak thermal inertia; the thermal insulators must be reduced to a minimum near the internal junctions.

The microcalorimetric elements are identical and grouped in pairs in the calorimetric block according to the differential system, i.e. in the way one would proceed to associate piles in opposition; the two wires (being of the same nature) coming from the internal chamber I, and from the external chamber E respectively, are dealt with as if they were the + and − poles of an ordinary galvanic element.

The temperatures of the homologous external junction of two elements associated in differential in the block have to be identical at any given moment.

The only purpose of the differential set-up is to eliminate the influence of the temperature changes of the block in the course of time. The reference calorimeter remains constantly at the temperature of the block, and the compensation (when produced) takes place only in the laboratory cell, so as to bring its temperature back to that of the block (the temperature defining the experimental zero). No compensation is carried out in the reference element, as one does not rely on a complete alikeness of two elements from the point of view of their thermal losses when the same heat power is produced in them, and inversely, one cannot assume an alikeness of the heat powers when the electromotive forces of the detector piles are alike.

The carrying out of the compensation exclusively in the laboratory cell leads to the use of the Peltier effect in one group of thermocouples in contact with that cell as shown in the wiring diagrams, as this is the best means for compensating for the loss of heat.

In a preferred embodiment, each calorimetric element has 4 posts (2 of them corresponding to the detector thermopile, and 2 to the pile producing the Peltier effect). As there are 4 calorimetric elements in the block, there are, therefore, 16 wires connecting the elements to the switch. There are also 2 wires connecting each galvanometer to the switch (which makes 4 wires for 2 galvanometers), and 2 more wires connecting the switch to the + and − posts of the source of electricity which is to produce the Peltier effect.

The lay-out of the two thermoelectric piles (arranged like radii around the cell of the microcalorimetric element) is shown in FIG. 3.

---

[1] F. D. Rossini—Experimental Thermochemistry, chapter XII, being issued by Interscience Publishers, New York.

The thermocouples form vertical rectangular plates, each containing, for instance, 50 Chromel-constantan couples, one edge being applied to a generatrix of the cylindrical socket (internal chamber), and the other edge being applied to a generatrix of the inner wall of the casing (external chamber).

We have, thus, distributed, for instance, 24 regularly spaced plates around the socket. The drawing in FIG. 3 shows a cross section of 12 double plates, which makes 24 plates.

The plates are connected in series so as to form two groups regularly distributed around the socket: e.g. 4 double plates constituting what we call the small pile, and the 8 others constituting the big pile.

The two terminals of each pile lead to two posts indicated on the drawing as $e$ and $i$ for the small pile, and E and I for the big pile. The letters $e$ and E indicate the wires coming from the external chamber, and the letters $i$ and I those coming from the internal chamber.

In short, all the plates of couples are identical, but the small pile contains a lower number of couples than the big pile. One pile is used to detect the temperature difference between the two chambers (internal and external) while the other is used to produce the Peltier cooling-down effect at the level of the internal chamber. The detecting and compensating functions of the two piles are interchangeable.

Thermochemical Measurements

The quantity of heat Q, released in the time interval between $t_1$ and $t_2$ in the course of a thermochemical experiment is obtained by measuring on one hand the compensated heat $Q_c$, and on the other hand the area A, bordered by the recorded curve, the time axis (experimental zero), and the ordinates $t_1$ and $t_2$; to this we have to apply a certain correction, called heat capacity correction.

In fact, by integrating Equation 2 we obtain:

$$\int_{t_1}^{t_2} W dt = \int_{t_1}^{t_2} W' dt + \int_{t_1}^{t_2} \frac{p}{g} \Delta dt + \int_{t_1}^{t_2} \frac{\mu}{g} \frac{d\Delta}{dt} dt$$

$$Q = Q_c + A + \frac{r}{g}(\Delta_2 - \Delta_1)\frac{\mu}{g} \qquad (10)$$

The heat capacity correction $$(\Delta_2 - \Delta_1)\frac{\mu}{g}$$

is null in the case where the ordinates $\Delta_2$ and $\Delta_1$ of the recorded curve, corresponding to the times $t_1$ and $t_2$ are equal. In general, this correction is unimportant and can be readily calculated.

The inventor has found that it is unnecessary to achieve a complete compensation of the whole heat produced. After a preliminary experiment, we calculate the Peltier current which brings about an approximate compensation of the order of 90%, for instance. The Peltier current is measured with excellent reference apparatus, and is then known with a high precision. If the corrections for the area A of the curve, and the heat capacity are then known to within 1%, the relative error will only be 1/1000.

For experiments of medium precision, 1% for instance, it is not necessary to carry out a Peltier compensation; in this case it is sufficient to measure only the area of the recorded curve (by taking into account, if this is necessary, the heat capacity correction).

The calibration producing the permanent deviation for a constant power W is made either by using the Joule effect, or, better, with a radioactive standard, which in its turn, is calorimetrically calibrated. The radioactive standards have the advantage of releasing a heat flow which is independent of the temperature (discarding, thus, the temperature corrections).

Study of the Thermokinetics of a Slow Phenomenon

We call thermokinetic curves, the curves (2), giving the heat powers W, produced as a function of time $t$:

$$W = f(t) = W' + \frac{p}{g}\Delta + \frac{\mu}{g}\frac{d\Delta}{dt} = W' + \frac{p}{g}\left(\Delta + \frac{\mu}{p}\frac{d\Delta}{dt}\right)$$

Now, the microcalorimeter registers the curve $$\Delta = \varphi_{(t)} \qquad (11)$$

To pass from the latter (11) to curve (2), it is necessary to apply to the ordinates of (2) a correction, which consists of adding, for each point, a proportional length to the slope of the curve. The proportionality coefficient $$\frac{\mu}{p}$$

is nothing more than the time constant of the apparatus, determined by the study of the return curve to the experimental zero, after having cut off a constant heat power W, developed in the cell. As to these calibrations, a description of them will be found in F. D. Rossini's "Experimental Thermochemistry" (chapter XII), being published by Interscience Publishers, New York.

For slow phenomena, the corrections to be applied to the recorded curves are very small, and the directly recorded curves $\Delta = \varphi_{(t)}$ indicate in most cases, without any correction, the tendency of the kinetics of the phenomenon studied. Yet, it is interesting to note that we know perfectly well how to make those corrections to obtain in any case the accurate curves of the thermokinetics.

The Isothermal Distillation and Its Consequences

Let us connect by a tube, provided with a stopcock R, two cells $C_1$ and $C_2$, which are part of two microcalorimetric elements placed side by side in the same calorimetric block (FIG. 14). These cells are thus, at any moment, at the same temperature. Now, a liquid L, placed in cell $C_1$, will distil into cell $C_2$ whenever the vapor pressure in 2 is lower than in 1, that is:

(1) When cell $C_2$ contains a non-volatile substance, dissolved in liquid L; it is, in fact, known that the vapor pressure of such a solution is inferior to that of the pure solvent at the same temperature.

(2) When cell $C_2$ contains an absorbent or adsorbent of liquid L, as is the case with solids, which may be covered, by adsorption, with a film of liquid L.

These two cases are very interesting. In fact, the first case leads to the measurement of the molecular weights of dissolved substances, while the second one leads to the measurement of the surface areas of powdered substances and particularly to the study of the activity of catalysts.

1st Case—Measurement of the Molecular Weights of Dissolved Substances

The rate of distillation into the air (or any other gas), for a given pressure and a constant stop-cock opening, is proportional to the difference $\Delta p$ of the vapor pressures of the solvent and the solution. Now, $\Delta p$ is given by the Raoult law for sufficiently diluted solutions:

$$\frac{\Delta p}{p} = k \frac{c}{M}$$

For the same concentration $c$ of different substances in the same solvent, $\Delta p$ is thus inversely proportional to the molecular weight M of these substances, which means, that the rate of distillation is inversely proportional to the molecular weight of the dissolved substance. It is thus sufficient to measure these rates of distillation, and to know one of the molecular weights of the dissolved substances, to find the others. The comparison of the rates of distillation is made by means of the heat flows absorbed in cell $C_1$.

The method is very sensitive, as the inventor's apparatus produces a galvanometer light spot deviation of 1 mm. on a scale placed at 1 m. from the mirror, for a heat flow of $\frac{1}{1000}$ calorie per hour, which corresponds to $\frac{1}{600,000}$ gram water distilled per hour. No balance could show such a sensitivity. It is thus possible to work with very diluted solutions, and also to adapt the method to the measurement of the molecular weights of macromolecular substances.

*2nd Case—Measurement of the Differential Heats of Adsorption*

It is possible to obtain simultaneously both recordings, thermal and gravimetrical, produced by the adsorption of the vapor of liquid L, placed in cell $C_1$ by an adsorbent placed in cell $C_2$.

For that purpose, the detector piles of the elements 1 and 2 are connected according to the additional set-up (piles in series). One obtains then the algebraic sum of the thermal effects due to the vaporization of liquid L and the condensation of this vapor on the adsorbent. This represents the adsorption heat flow of liquid L.

As was seen, the additional set-up must be completed by another additional set-up used as a reference system; the two additional systems are then grouped in opposition (additional-differential set-up) to insure an experimental zero independent of the temperature changes of the exterior.

To obtain the gravimetric recording, it suffices to estimate the heat flows produced by the vaporization of liquid L, by using as detector the second pile of the calorimetric element 1, grouped in opposition (differential system) with the analogous pile of one of the two reference elements of the preceding system.

The recorded curve obtained is, within a factor of proportionality which is the latent heat of vaporization of the liquid, the same as $$\frac{dp}{dt}=g(t)$$

$p$ being the weight of the adsorbed liquid.

By integration of this curve, we obtain $p$ as a function of $t$, which means that we make a continuous microcalorimetric weighing recorded and outstandingly sensitive.

The two curves of the thermokinetics and the gravimetry of adsorption allow us to obtain the differential heat of adsorption $dq/dp$ as a function of $p$. We know that this value is of great interest for the study of catalysts.

*3rd Case—Measurement of the Specific Surfaces of Adsorbing Powers, and in Particular of Catalysts*

The inventor has already published the description of the following phenomenon, which is, in his opinion, the most curious of those he could make conspicuous.

When we bring into contact with the water vapor of a liquid L, a powdered substance capable of adsorbing it with enough energy, a monomolecular film is formed on the surface of the powder particles; we register a regular heat release; this flow is constant in certain cases when the flow of adsorbed vapor is sufficiently small. The end of the formation of the monomolecular film is shown by a sudden break in the record curve. This break is easy to locate.

We measure then the weight P of the adsorbed liquid (having the molecular weight M) when the break occurs. If we know the molecular surface $\sigma$ occupied by molecules of this liquid, we may immediately deduce the specific surface S of the adsorbent. In fact, for one gram of the substance, we have:

$$S=\frac{P}{M}N\sigma$$

N being the number of Avogadro.

As adsorbed liquid L, the inventor used water, for which $\sigma=10.6\ A^2$.

The inventor also operated with a number of organic substances (such as acetone, alcohols, aromatic hydrocarbons, etc.).

Inversely, by knowing S (measured with water), we may deduce $\sigma$ from the preceding expression for any substance adsorbed. It was thus possible to measure, in particular, the space taken up by molecules of alcohols adsorbed on alumina.

These measurements made it possible to demonstrate that the molecules adsorbed on the solid are lying flat on the adsorbent, and not in a perpendicular position with respect to the adsorbing surface as is the case for the long chains of alcohol or fatty acids adsorbed on the surface of water.

The knowledge of the molecular surface occupied provides us with valuable information as to the structure of the adsorbed substance, and this is an unexpected result of the microcalorimetric measurements.

*Quantitative Differential Thermal Analysis*

The inventor's microcalorimeter may efficiently be used for the quantitative, differential thermal analysis. For this purpose, it is only necessary to make the temperature rise as a function of time.

The deviations of the galvanometer light spot being strictly proportional to the lost heat flow, the recorded curves giving the heat flows with respect to time, correspondent then, within a constant of proportionality, to those which give the heat flow as a function of temperature.

The calculation of the quantities of heat produced is made in the same way as for experiments carried out at a common temperature.

As to the latest apparatus of this invention, they are reliable enough for high precision work without any Peltier compensation. The Peltier effect is then only used to determine the constants of the apparatus, in particular the thermal disequilibrium coefficient. The latter determination has lately taken up a new importance, for measuring the specific heats and the thermal conductivities by means of the inventor's microcalorimeters.

Finally, by mounting the elements as independent units, we are able to carry out not only the differential set-up, but still other systems, such as the additional set-up, and the additional-differential system with 4 elements, which allows us to measure the heat of isothermal distillation and the differential heats of adsorption with microcalorimetric weighing, while it make the system independent of the variations of the external temperature.

The uniform distribution of the temperatures in twin elements associated in a differential set-up through the use of equidistributing cones and thermal lenses.

A considerable progress in the uniform distribution of the thermal disturbances in twin elements has been achieved, when the inventor placed the microcalorimetric block between the bases of two cones, coaxial with the block, the summits of the cones being applied to the centers of the bases of a very thick cylindrical metal shell made of a good heat conducting metal (FIG. 1). Under these conditions, the lateral thermal disturbances (which affect more than any others the sensitivity of the apparatus) are converted into vertical disturbances uniformly distributed, and at the same time considerably attenuated, which do not affect a differential set-up. The use of thermal lenses to distribute uniformly these disturbances on the bases of the block is in general not indispensable for low and medium precision measurements, being more valuable to give high precision measurements. Reliability is basically insured by the use of the equidistributing cones.

The thermostats not only maintain a constant temperature $\pm\frac{1}{1000}°$ C. approximately, but above all distribute the local lateral disturbances on the whole lateral surface of the thick-walled cylindrical central shell.

In some cases (for low temperatures in particular) a fast circulation of a liquid maintained at a constant temperature, around the wall is helpful.

For all cases, a series of multiple enclosures made of a good heat conducting metal is employed. The novel enclosures may include one made by rolling a long sheet of aluminum round the central shell, wire being wound between the spirals. These wires prevent at the same time the vertical convection of the air, and favor on the contrary a horizontal convection, desirable for our purposes.

As many apparently widely different embodiments of the present invention may be made without departing from the spirit and scope thereof, it is to be understood that the invention is not limited to the specific embodiments.

What is claimed is:

1. A calorimeter having a reaction vessel, a plurality of identical uniformly spaced thermocouples in contact with the surface thereof, said thermocouples completely and uniformly covering the surface of the reaction vessel, a first circuit connecting alternate ones of the thermocouples, a galvanometer connected to the first circuit to detect changes in the output of the thermocouples connected to said first circuit, and a second circuit adapted selectively to connect the other thermocouples to a source of electric power.

2. A calorimeter having inner and outer chambers bridged by a plurality of identical thermocouple piles having their junctions identical, arranged at equal distances from each other, and covering the inner chamber, a first circuit connecting alternate ones of the thermocouples, a galvanometer connected to the first circuit to detect changes in the output of the thermocouples connected to said first circuit, and a second circuit adapted selectively to connect the other thermocouples to a source of electric power.

3. A calorimeter having inner and outer chambers and a plurality of thermoelectric piles arranged in two sets in contact with them, one of said sets of piles being connected to a galvanometer and the other to a controllable source of electricity, the piles of the two sets being alternated in a regular way, all the thermocouple elements being of the same nature, shape, and thermal and electrical properties, arranged at equal distances from each other and uniformly covering the surface of the inner chamber.

4. A calorimeter having inner and outer chambers bridged by thermocouple piles having their junctions identical, arranged at equal distances from each other, and thermally contacting the outer side wall of the inner chamber, the thermocouples being in the form of annular disc-shaped cakes piled up around the inner chamber, the inner peripheral surfaces of the cakes bearing the junctions cooperating with the inner chamber.

5. A calorimeter as claimed in claim 4, wherein the outer peripheral surfaces of the cakes bear further junctions spaced at equal distances therearound and thermally contacting the inner side wall of the outer chamber.

6. A calorimeter as claimed in claim 5, wherein the body of each of the annular disc-shaped cakes is made of insulating material, and the inner and outer junctions are in the form of soldered joints between two dissimilar thermocouple-forming wires.

7. A calorimeter having a metal block, a first and a second identical calorimetric element symmetrically arranged in cavities in said block, each element comprising an inner and outer chamber connected by thermoelectric piles, the piles of each set of chambers comprising a first set of piles uniformly distributed around the inner chamber and a second set of piles uniformly distributed around the inner chamber and uniformly distributed between the piles of the first set, the first sets being identical and the second sets being identical, the second sets containing a substantially larger number of piles than the first sets, electric components comprising a galvanometer, a resistance, a source of direct current, and circuits including switches for selectively connecting the piles and the components as follows: (1) to form a closed first circuit consisting of the two first sets of piles connected in opposition and in series with the resistance and the galvanometer; and a second circuit consisting of one of the second sets of piles operating to cool by the Peltier effect and the source of current connected thereacross; (2) to form a closed first circuit consisting of the two first sets of piles connected in opposition and in series with the galvanometer; and a second circuit consisting of one of the second sets of piles operating to cool by the Peltier effect and the source of current connected thereacross; and (3) to form a closed first circuit consisting of the two second sets of piles connected in opposition and in series with the galvanometer; and a second circuit consisting of one of the first sets of piles operating to cool by the Peltier effect and the source of current connected thereacross.

8. A calorimeter as claimed in claim 7, wherein a first one of the calorimetric elements is a laboratory element, the second one of the calorimetric elements is a reference element, and wherein the parts are so arranged that the piles of the first element are those which are selectively employed to cool the element by the Peltier effect.

9. A calorimeter having a metal block, two calorimetric units symmetrically disposed in said block, each unit consisting of a first and a second calorimetric element symmetrically arranged in cavities in said block, each element comprising an inner and outer chamber connected by thermoelectric piles, the piles of each element comprising a first set of piles uniformly distributed around the inner chamber and a second set of piles uniformly distributed around the inner chamber and uniformly distributed between the piles of the first set, the piles of each of the first sets of piles being identical and the piles of each of the second sets of piles being identical, the second sets of piles containing a substantially larger number of piles than the first sets of piles, each calorimetric unit comprising a galvanometer, a resistance, a source of direct current, and circuits including switches for selectively connecting the piles and the components as follows: (1) to form a closed first circuit consisting of the two first sets of piles connected in opposition and in series with the resistance and one of the galvanometers, and a second circuit consisting of one of the second sets of piles operating to cool by the Peltier effect and the source of current connected thereacross; (2) to form a closed first circuit consisting of the two first sets of piles connected in opposition and in series with the said above-recited one galvanometer; and a second circuit consisting of one of the second sets of piles operating to cool by the Peltier effect and the source of current connected thereacross; and (3) to form a closed first circuit consisting of the two second sets of piles connected in opposition and in series with the said above-recited one galvanometer; and a second circuit consisting of one of the first sets of piles operating to cool by the Peltier effect and the source of current connected thereacross, and means selectively to form: (4) a first circuit wherein the two first pile sets of the two first calorimetric elements are connected in opposition and in series with the first galvanometer; and a second circuit wherein one of the second sets of piles of each of the two calorimetric units is connected additively to the other second set of piles in the same calorimetric unit, and the thus additively connected sets of piles are connected in opposition and in series with the other, second galvanometer.

References Cited in the file of this patent

UNITED STATES PATENTS 405,849    Rinehart _____ June 25, 1889

FOREIGN PATENTS 953,800    France _____ May 30, 1949
1,109,877   France _____ Oct. 5, 1955